US012600606B2

(12) United States Patent
Wen

(10) Patent No.: US 12,600,606 B2
(45) Date of Patent: Apr. 14, 2026

(54) APPARATUS AND METHOD FOR AUTOMATICALLY LIFTING / LOWERING A VEHICLE

(71) Applicant: Hongbin Wen, Mississauga (CA)

(72) Inventor: Hongbin Wen, Mississauga (CA)

( * ) Notice: Subject to any disclaimer, the term of this patent is extended or adjusted under 35 U.S.C. 154(b) by 372 days.

(21) Appl. No.: 16/833,497

(22) Filed: Mar. 27, 2020

(65) Prior Publication Data

US 2020/0223675 A1 Jul. 16, 2020

Related U.S. Application Data

(63) Continuation-in-part of application No. 16/403,477, filed on May 3, 2019, now Pat. No. 11,472,239.

(60) Provisional application No. 62/824,308, filed on Mar. 27, 2019, provisional application No. 62/666,481, filed on May 3, 2018.

(51) Int. Cl.
*B66F 3/46* (2006.01)

(52) U.S. Cl.
CPC ..................................... *B66F 3/46* (2013.01)

(58) Field of Classification Search
CPC ... B66F 3/46; B60C 25/0515; B60C 25/0548; B60C 25/138; B60B 2340/70
See application file for complete search history.

(56) References Cited

U.S. PATENT DOCUMENTS 2,949,978 A * 8/1960 Halstead .................. B66F 7/18 187/219
3,405,781 A * 10/1968 Brown .................... B66F 7/025 187/210
11,708,004 B2 * 7/2023 Zhang ..................... B60L 53/80 320/109
11,859,448 B1 * 1/2024 Heidemann ............... B66F 3/46
2015/0307335 A1 * 10/2015 Beebe .................. B66F 7/0625 254/93 A
2018/0313494 A1 * 11/2018 Domsic ..................... B66F 3/00
2018/0339890 A1 * 11/2018 Perlstein ................... B66F 3/46
2019/0037113 A1 * 1/2019 Irie .................... H04N 5/22521
2020/0407206 A1 * 12/2020 Bowers ..................... B66F 3/46

FOREIGN PATENT DOCUMENTS

CA 2835672 A1 * 6/2014 ................ B66F 3/46
EP 2316778 A1 * 5/2011 ............. B66F 17/00

* cited by examiner

*Primary Examiner* — Joshua E Rodden

(57) ABSTRACT

A robot tool for automatically lifting/lowering a vehicle, including a control system, an image system, a plurality of jacks and a driving device. The image system has aiming devices and can capture images above the jacks. The control system can exchange data with the outside world and store data which includes commands, setup information, characteristic parameters and images of vehicles. The control system can obtain positioning images from image system containing information of relative position in horizontal direction between vehicle lifting points and the corresponding jacks. The control system can analyze said positioning images and compare them with the received data to navigate said driving device to move said jacks horizontally, so that each of at least two lifting points of said vehicle can be vertically aligned by a jack below, said control system is capable of operating the jacks to raise or lower the lifted vehicle.

19 Claims, 10 Drawing Sheets

APPARATUS AND METHOD FOR AUTOMATICALLY LIFTING / LOWERING A VEHICLE

CROSS REFERENCE TO RELATED PATENTS

The present application claims priority pursuant to 35 U.S.C. § 119(e) from U.S. Provisional Application Ser. No. 62/824,308 filed on Mar. 27, 2019. The disclosures of the above-numbered applications are hereby incorporated herein by reference in their entirety and made part of the present application for all purposes.

The present application for US filing purposes is a continuation in part of U.S. patent application Ser. No. 16/403,477 filed May 3, 2019, entitled "APPARATUS AND METHODS FOR ROBOTICALLY SERVICING A VEHICLE WHEEL", and is also a continuation in part of U.S. Patent Application 62/666,481 filed May 3, 2018, entitled "WHEEL LOADER".

FIELD OF THE INVENTION

This invention relates to a robot tool for automatically lifting or lowering a vehicle and to methods of automatically lifting or lowering a vehicle. Said robot tool is also referred to as Vehicle Lifting Robot hereinafter.

BACKGROUND OF THE INVENTION

In existing technologies, each time when a vehicle needs to be lifted for works like oil change or wheel change, lifting equipment is used to lift vehicle body so that its body can leave the ground or floor to a desired height, the horizontal position of the contact pads of the equipment, such as rubber pads used to contact the lifting points of the vehicle, have to be manually adjusted to make them vertically aiming at the jack points on the vehicle underbody, and the height of said vehicle when lifted has to be controlled manually. This is a low-efficiency and low safety way to lift a vehicle.

The reason of adjusting positions of said contact pads is, in the actual operation process, each time the positions of lifting points on underbody of a parked vehicle relative to lifting equipment must have a certain range of random distance deviations and angular deviations, due to the difference of vehicles, and different final parked position of the vehicle. Whereby there may the need to automatically aim the contact pads of the lifting equipment at corresponding said lifting points of the vehicle and automatically lift or lower down the vehicle from a position to a desired height.

Therefore, there can be an automated lifting device whose contact pads can move by itself to vertically align with corresponding lifting points on a vehicle underbody automatically, and raise or lower the vehicle from a starting position to a specified height automatically, so that work efficiency and safety can be greatly improved.

A vehicle is a collective term that includes various automobile like cars, buses, trucks, or various train cars, etc. Hereinafter, a vehicle is also simply referred to as a car, and a car is taken as an example to illustrate the relevant details of the invention. For lifting other types of vehicles, the technical details described below also apply.

BRIEF DESCRIPTION OF THE DRAWINGS

For simplicity and clarity of illustration, elements illustrated in the accompanying figure are not drawn to a common scale. For example, the dimensions of some of the elements are exaggerated relative to other elements for clarity. Circuits, wires/tubes/pipes, joints, connectors, etc. for electronics/electrical, pneumatics, vacuum, hydraulic, etc. are not shown in the figures. Wherein.

LIST OF REFERENCE CHARACTERS

| Item No. | Name |
|---|---|
| 1 | Base |
| 2 | Turntable |
| 3 | Longitudinal Linear motor |
| 4 | Telescopic rod of 3 |
| 5 | Jack |
| 6 | Bottom face of Jack 6 |
| 7 | Transverse Linear motor |
| 8 | Telescopic rod of 7 |
| 9 | Frame |
| 10 | Shaft |
| 11 | Joint shaft |
| 12 | Box |
| 13 | Deflection motor |
| 14 | Image capturing and lighting module |
| 15 | Driving motor |
| 16 | Pattern transmitter |
| 17 | Special pattern transmitter |
| 18 | Camera |
| 19 | Dedicated graphic sensor |
| 20 | Contact pad of the jack |
| 21 | Platform |
| 22 | Parking surface |
| 23 | Vehicle body |
| 24 | vehicle underbody |
| 25 | Lifting points of the vehicle |
| 26 | Vehicle Longitudinal middle plane |
| 27 | Designated driving direction |
| 28 | Designated driving direction vector |
| 29 | Vehicle orientation vector |
| 30 | Jack orientation vector |
| 31 | Joint block |
| 32 | deflection actuator |
| 33 | Parking azimuth |
| 34 | Jack azimuth |
| 35 | Target vehicle |
| 36 | Seat |
| 37 | Light |
| 38 | Shaft tube |
| 39 | Stator of 3 |
| 40 | Stator of 7 |
| 41 | mable camera |

DETAILED DESCRIPTION OF THE INVENTION INCLUDING THE PRESENTLY PREFERRED EMBODIMENTS

Before the detailed description of the invention, the vehicle lifting and lifting points on vehicle underbody will be introduced.

For ordinary vehicles, especially automobile, the lifting points are normally located on the underbody of the vehicle. For different vehicle, the lifting points are placed in different layouts on the underbody of the vehicle. As an example, for the car 1 shown in FIG. 14, FIG. 17, FIG. 18, the technical characteristics of underbody and lifting points are:

Vehicle's lifting points 25, are usually several high-strength small areas distributed on the underbody 24 of the vehicle. These small areas can withstand large force or pressure and are specifically designed for safely lifting the vehicle without damaging of the structure. The above-mentioned small areas as lifting points can be flats, raised ribs, or in other appropriate shapes.

Figure 17:
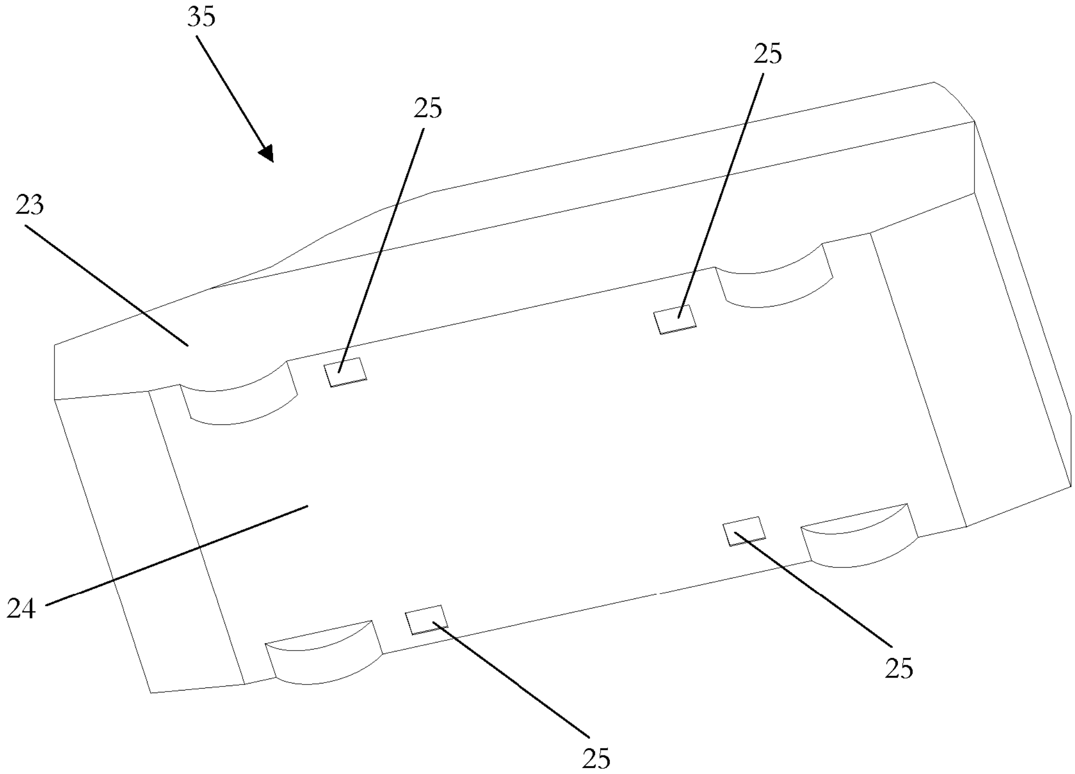
FIG. 17 is a perspective view of a passenger car, showing its underbody with the lifting points.

Most vehicles have 4 lifting points distributed in the front, rear, left and right on the underbody. In most cases, each lifting point is between the front and rear axle, close to either the left or right edge of the vehicle body and close to either front or rear wheels, as shown in FIG. 17. The shape and size of the underbody of different vehicles can be different from each other, ranging from wide to narrow, long to short, and their lifting points can have different shape and layouts.

When a vehicle is parking on a flat horizontal surface, for the heights of the lifting points relative to said surface, the heights of the two front lifting points are mostly the same, and the heights of the two rear lifting points are also mostly the same, but said height of the front lifting points and that of the rear lifting points may be different.

Explanation of Technical Phrases Used Hereinafter

Figure 14:
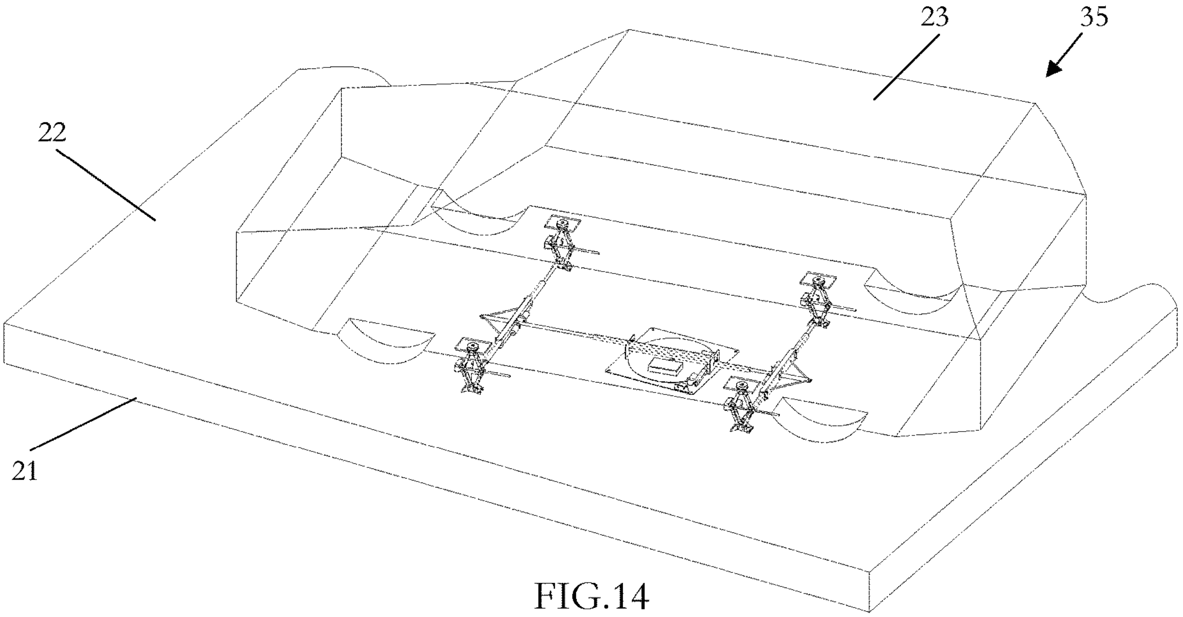
FIG. 14 is a perspective view showing a vehicle parked askew is lifted by the Vehicle Lifting Robot, in which said vehicle is set to be transparent.
Figure 15:
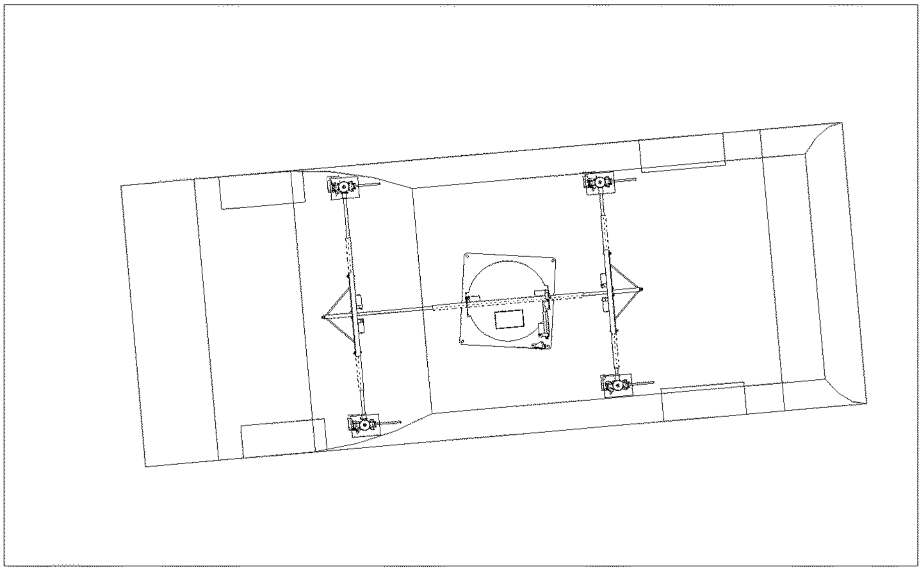
FIG. 15 is a top view showing the vehicle and the Vehicle Lifting Robot shown in FIG. 14, in which said vehicle is set to be transparent.
Figure 16:
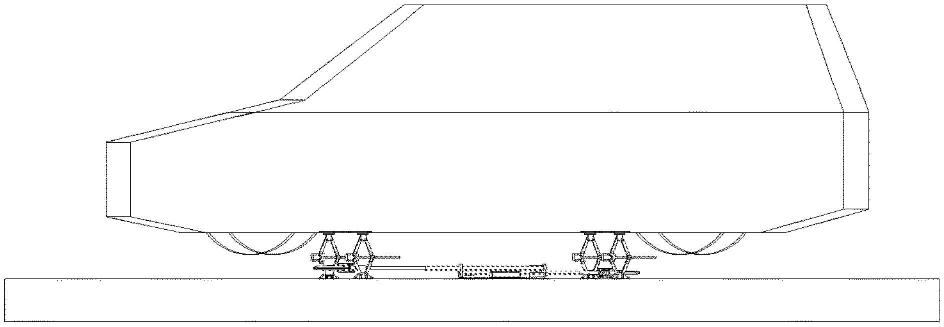
FIG. 16 is a side view showing the vehicle and the Vehicle Lifting Robot shown in FIG. 14.

For ease of explanation, in the following there are some actual or virtual technical feature hereinafter referred to as their corresponding technical phrases for the aligning work between lifting points and jacks, and used thereafter:

Parking surface 22: In the following paragraph, the identical flat and horizontal surface on which the vehicle 35 is parking and contact with each wheel is referred to as the parking surface, such as the ground or floor surface on which the car is parked, or as shown in FIG. 14, the upper surface 22 of the platform 21.

Figure 5:
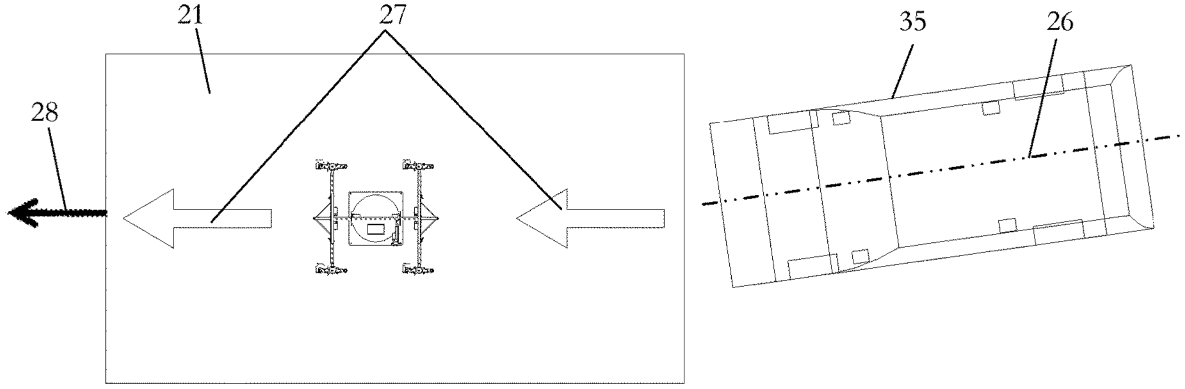
FIG. 5 is a perspective view showing a car is entering a platform which is mounted with a Vehicle Lifting Robot.
Figure 18:
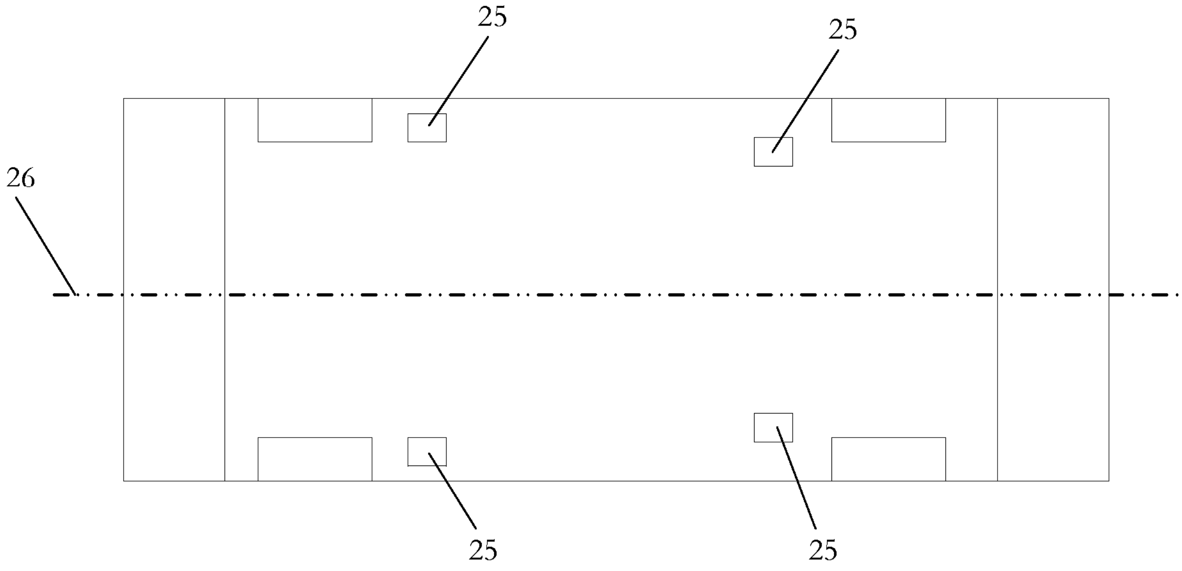
FIG. 18 is a bottom view of a car.

Vehicle Longitudinal middle plane 26: As shown in FIG. 5 and FIG. 18, the longitudinal middle plane of a vehicle.

Designated driving direction 27: As shown in FIG. 5, it is the predetermined nominal vehicle driving direction parallel to the parking surface, with the direction pointing from the back of the vehicle to the front, as shown in FIG. 5. For example, the parking surface is a narrow rectangular area, and the Designated driving direction is parallel to the parking surface and the longer edge of the rectangular area, with the direction from the back of the vehicle to the front.

Longitudinal: Approximately parallel to the Designated driving direction, and approximately parallel to the parking surface.

Transverse: Approximately perpendicular to Designated driving direction 27 and approximately parallel to the parking surface.

Designated driving direction vector 28: As shown in FIG. 5, this vector is parallel to and has the same direction as the Designated driving direction 27.

Figure 6:
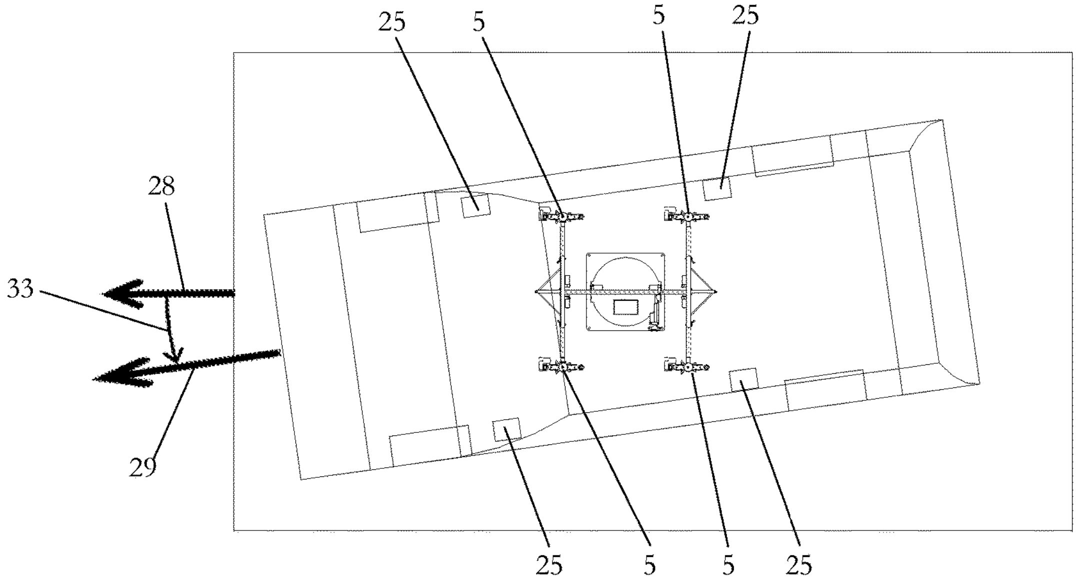
FIG. 6 shows the car in FIG. 5 is parking above said Vehicle Lifting Robot now.

Vehicle orientation vector 29: As shown in FIG. 6, this vector points from the back of the vehicle to the front, and is parallel to the parking surface and vehicle longitudinal middle plane 26 (FIG. 5).

Parking azimuth 33: As shown in FIG. 6, for a vehicle parking on a parking surface 22, the Vehicle orientation vector 29 and Designated driving direction vector 28 form an angle 33, which can be called the Parking azimuth. Looking down from above, if setting Designated driving direction vector 28 as a datum, Parking azimuth 33 is positive when counter clockwise and negative when clockwise. When Vehicle orientation vector 29 is parallel to Designated driving direction vector 28 and in the same direction, the Parking azimuth 33 of said vehicle is zero.

Figure 9:
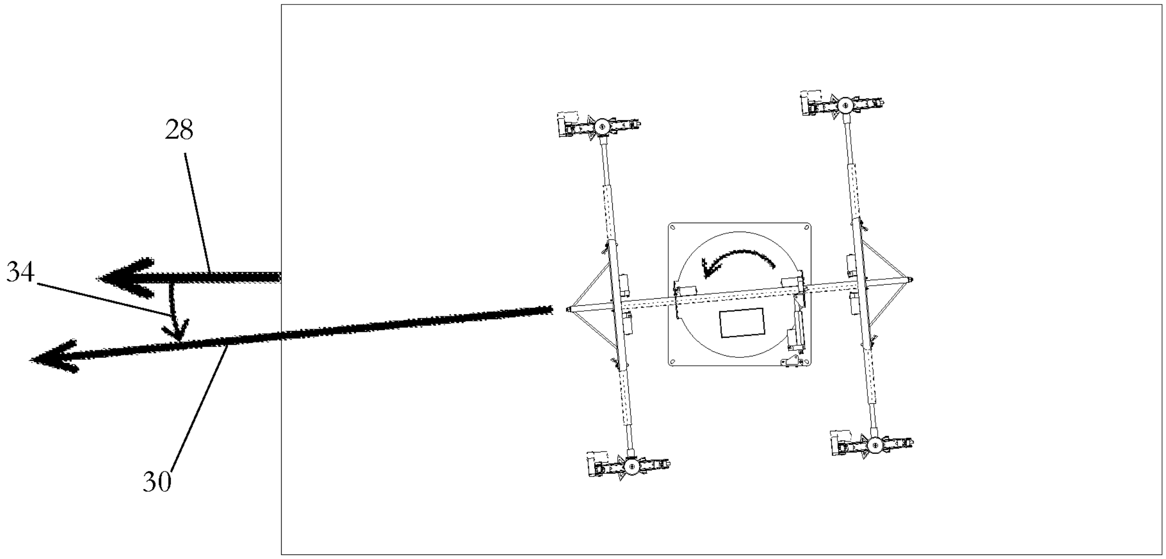
FIG. 9 is a top view showing the turntable of the Vehicle Lifting Robot is driven to rotate therefore the motors and jacks thereon are rotated an angle 34 around turntable pivot center.

Jack orientation vector 30: As shown in FIG. 9, the jack orientation vector 30 is parallel to the linear movement direction of the telescopic rod 4 of linear actuator 3, and pointing from the rear of the target vehicle to the front.

Jack azimuth 34: As shown in FIG. 9, this is the angle between the above-mentioned Jack orientation vector 30 and said Designated driving direction vector 28. Similarly, looking down from above, if setting Designated driving direction vector 28 as a datum, Jack azimuth 34 is positive when counter clockwise and negative when clockwise. When the Jack orientation vector 30 is parallel to the Designated driving direction vector 28 and in the same direction, the Jack azimuth 34 is zero.

Presently Preferred Embodiments

In the procedure of lifting different vehicles or the same vehicle in different times, the horizontal position of jacks 5 (FIG. 6) relative to the parking surface 22 need to be accurately adjusted to vertically align with their corresponding lifting points of a vehicle.

In overall, the Vehicle Lifting Robot can find out the parking azimuth of the currently parked vehicle to be lifted by using its aiming devices, imaging devices, sensors, driving device and control system. Then, by using driving device, Vehicle Lifting Robot can adjust its lift azimuth accordingly to make it equal to the parking azimuth of the vehicle, and use linear actuators to move its jacks longitudinally and transversely to bring them close enough to corresponding lifting points of the vehicle to capture images. Then using aiming devices fixed relative to each jack, and cameras or cameras bundled with aiming device, to transfer captured positioning images containing the information about the relative position between the vertical line passing each underbody lifting point and center of corresponding contact pad to control system, for calculation and analysis. Based on said results, the position of jacks can be tuned up when necessary, so that the points where the aiming devices are located can vertically align with the corresponding lifting point of the vehicle with sufficient precision. After that, directly based on relative position between a jack and its corresponding aiming device inputted into control system in advance, control system uses the driving device to move each jack so that center of their contact pad can vertically align with the previous position of their corresponding aiming device, therefore, the center of the contact pad of each jack can vertically align with the corresponding lifting point of the vehicle with sufficient precision, and then said vehicle can be lifted to required heights. Through the cooperation of cameras, sensors and control systems, the height change of the vehicle can be detected and controlled. The above process does not require manual intervention.

For clarity, some cameras, sensors and some other components are not shown in figures.

Detail Structure of Vehicle Lifting Robot

As shown in from FIG. 1 to FIG. 10, the vehicle lifting robot comprises a control system, a driving device, a plurality of jacks 5, an imaging system. Said vehicles like car 35 is parked above parking surface 22. Said driving device can drive jacks 5 to move along parking surface 22. Said imaging system can capture the image above each jack 5.

The control system is an electronic/electric system that controls various parts of the Vehicle Lifting Robot. It can transmit, stores, or creates signals and data. The control system can be placed inside or outside of the Vehicle Lifting Robot, and the control system can exchange data with outside at any time when needed, or be monitored and controlled by other systems, such as but not limited to an external task dispatch center. The control system includes, but is not limited to, computer/electrical/electronic hardware systems, and computer software systems with suitable control logic and algorithms, such as operating systems, machine vision systems, and application software, etc.

Said control system can receive data including commands, characteristic parameters of the vehicle, images of the vehicle underbody 24, etc. The control system can calculate to analyze and compare the captured images with the received data, then using the calculation result to navigate driving device to move jacks 5, so that at least two lifting points of the target vehicle may vertically align with corresponding jacks 5. Said control system can then operate said jacks 5 to lift target vehicle to desired height, or lower a lifted vehicle to a desired height, with the function of sensing height of the target vehicle.

Cameras, sensors, lights, lasers, or electromagnetic wave transmitters can be installed on the appropriate parts of the vehicle lifting robot as required, or they can be placed in appropriate locations outside the vehicle lifting robot.

Driving Device

Said driving device comprises a base seat fixed with parking surface 22 on which said vehicle parks, three linear actuator groups in which there are two linear actuators with telescopic directions angled to each other, the stator ends of said two linear actuators in the same linear actuator group are rigidly connected together, wherein:

The three linear actuator components are a first linear actuator group, a second linear actuator group, and a third linear actuator group. The movable end of one linear actuator in the first linear actuator group is connected with the middle of the second linear actuator group, and the movable end of the other linear actuator in the first linear actuator group is connected with the middle of the third linear actuator group, a jack is connected to movable end of each linear actuator in the second linear actuator group and the third linear actuator group, and the bottom surfaces of said jacks are parallel to said parking surface, the telescopic direction of all said linear actuators are parallel to said parking surface.

The structure of the driving device will be described through two following embodiments:

First Embodiment of Driving Device—Overall Rotation

The driving device comprises a turntable and a rotary drive motor 13, the first linear actuator group is fixed on the turntable, the turntable is rotatably mounted on the fixed base 1, and the deflection motor can drive the turntable and the first linear actuator group to rotate around the fixed base. The first two linear actuator groups can bring the remaining two linear actuator groups to rotate accordingly, and the rotation angular velocity of all three linear actuator groups is the same. Any movable end of a linear actuator in the first linear actuator group can drive the corresponding one of the remaining two linear actuator groups to move.

Figure 1:
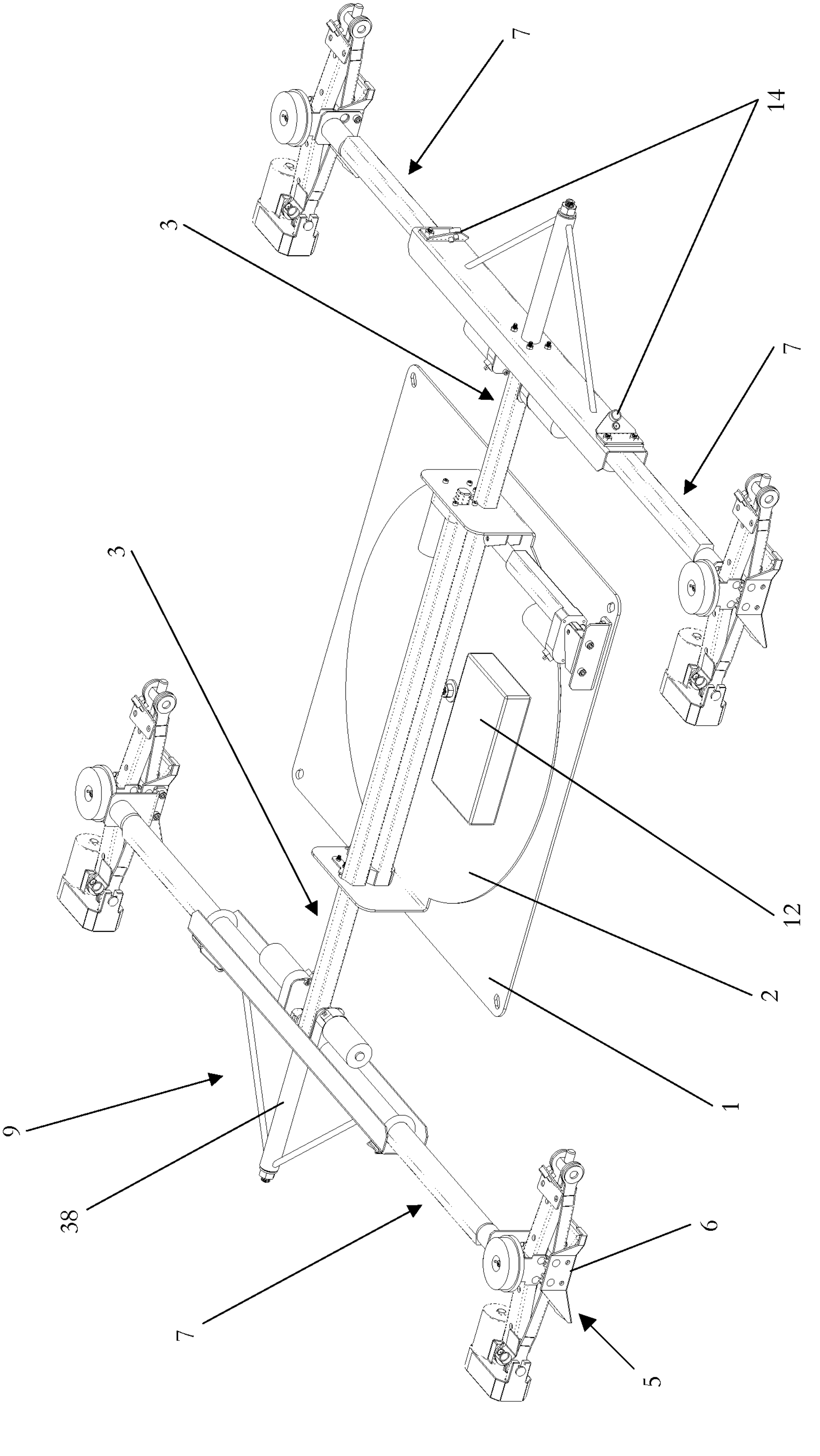
FIG. 1 is a perspective view from one side of the Vehicle Lifting Robot.
Figure 2:
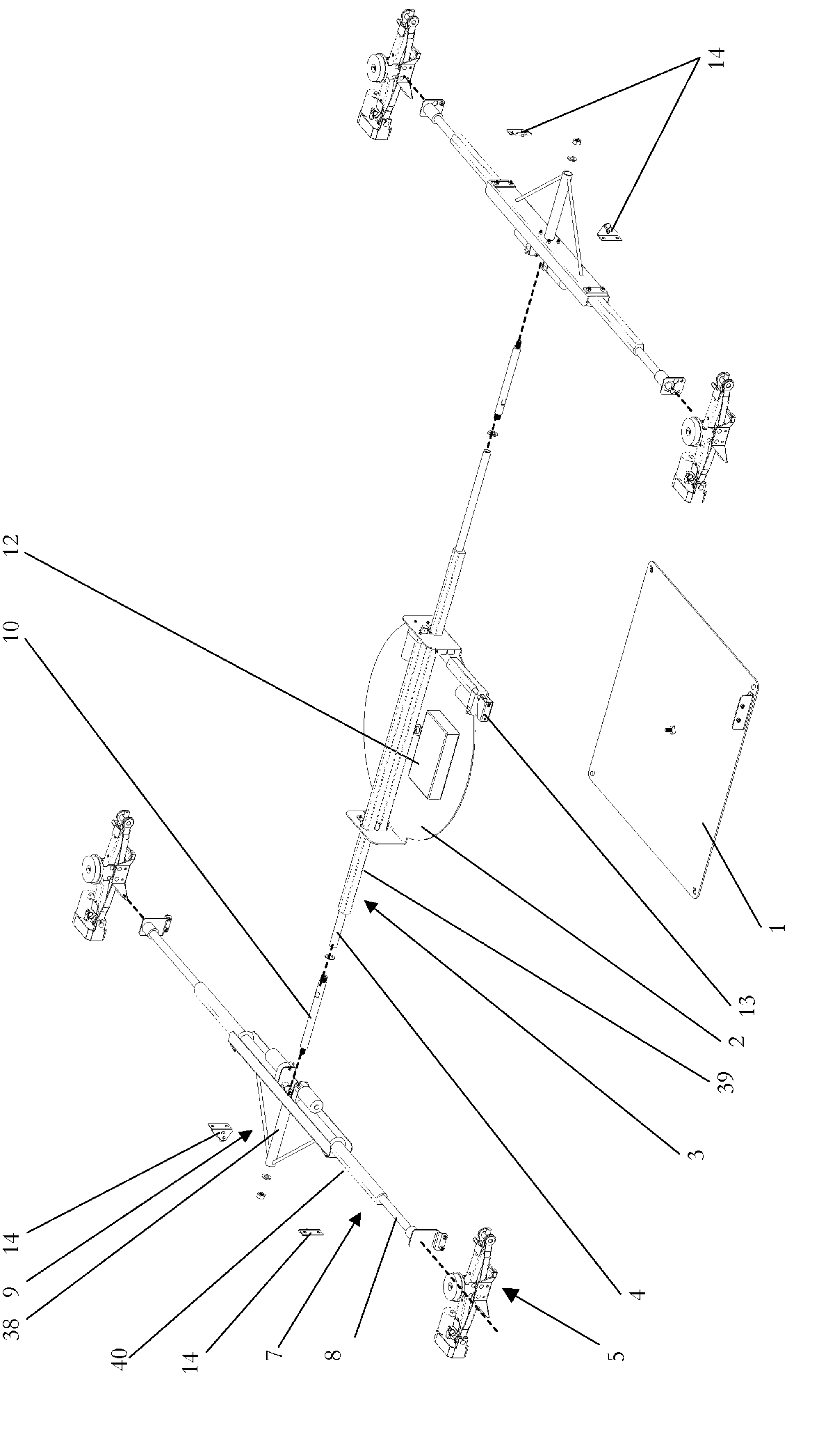
FIG. 2 is an exploded perspective view of the Vehicle Lifting Robot, showing its structure and components.

As shown in FIGS. 1 and 2, the driving device includes a base 1, a turntable 2, a deflection motor 13, a pair of longitudinal linear actuators 3, a pair of brackets 9, two pairs of lateral linear actuators 7, and four jacks 5. A pair of longitudinal linear actuators 3 constitute the first linear actuator group, each of the second linear actuator group and the third linear actuator group comprise a pair of transverse linear actuators 5 and a piece of frame 9, the deflection motor 13 can drive turntable to rotate.

Said base 1 is fixed on the parking surface 22 of a platform 21 (as shown in FIG. 5), such as a floor. Turntable 2 is pivotably mounted on the base 1 and is rotatable around base 1 about a vertical axis. Each end of a deflection motor 13 is separately hinged to base 1 and turntable 2, so deflection motor 13 can drive turntable 2 to rotate relative to base 1 about a vertical axis. Box 12 for containing control system can be mounted on turntable 2.

Each stator 39 of two longitudinal linear actuators 3 are mounted on the turntable 2 in parallelly and in opposite directions. Telescopic rod 4 of each linear actuator 3 (a moving end of the first linear actuator group) is jointed to a frame 9, each telescopic rod 4 can drive its corresponding frame 9 to move back and forth along its telescopic direction.

In this embodiment of the driving device, said telescopic rod 4 can either rigidly fixed with frame 9, or pivotably connect with frame 9 by a hinge. Said hinge comprises a shaft 10 fixed coaxially with the end of a telescopic rod 4, and a shaft tube 38 of a frame 9. The shaft 10 is inserted into the shaft tube 38 of the frame 9, and their relative axial movement is limited, so the frame 9 can rotate around the shaft 10 but can not move axially relative to the shaft 10, with this way, uneven of the parking surface 22 such as floor can be treated to make movement of frame 9 more smooth. Thus, each longitudinal linear actuator 3 can drive its corresponding frame 9 to move longitudinally relative to the turntable 2.

Each stator 40 of two transverse linear actuators 7 are mounted on the frame 9 in-line and in opposite directions. The telescopic direction of rod 8 (a moving end of the second or third linear actuator group) is angled to the telescopic direction of rod 3, for example perpendicular. The bottom 6 of each jack 5 is fixed to the end of telescopic rod 8 of each transverse linear actuator 7, and the bottom 6 (FIG. 3) of the jack 5 is above, sufficiently close to, and parallel to parking surface 22. Therefore, each transverse linear actuator 7 can drive its corresponding jack to move transversely relative to the turntable 2 and maintain standing orientation of said jack.

As known from the above, deflection motor 13 can drive turntable 2 to rotate relative to base 1, so that the linear actuators 3 and 5 can rotate around the rotation axis of turntable 2 and drive all the jacks to move accordingly, so Jack azimuth 34 can be changed to be equal to Parking azimuth 33.

Since each jack can move both longitudinally and transversely relative to the turntable 2, therefore, any jack can reach multiple positions within a range of area on the parking surface 22 through its appropriate longitudinal and transverse movements, along with rotation movement of frame 9.

Each of the longitudinal linear actuator 3 and the transverse linear actuator 7 can detect the moving distance of their corresponding telescopic rods 4 and 8 relative to their corresponding initial point, and can send said moving distance signal to the control system. Initial point of the telescopic rod's travel can be set to a point where the telescopic rod retracts to a distance close to the starting peak, such as a distance of 10 mm, for easier setup or tune-up. The initial point of each telescopic rod's travel can be triggered by a sensor (not shown in FIGs) in the corresponding linear actuator.

Similarly, an initial point can also be applied to Deflection motor 13 or the turntable, for setting up the initial point of angular travel of turntable.

Second Embodiment of Driving Device—Partial Rotation

The driving device has at least one deflection actuator, and the stator of each linear actuator in the first linear actuator group is rigidly fixed to the fixed base, and at least one of the remaining two linear actuator groups can be driven to rotate relative to the first linear actuator group by said deflection actuator about an vertical axis.

Figure 19:
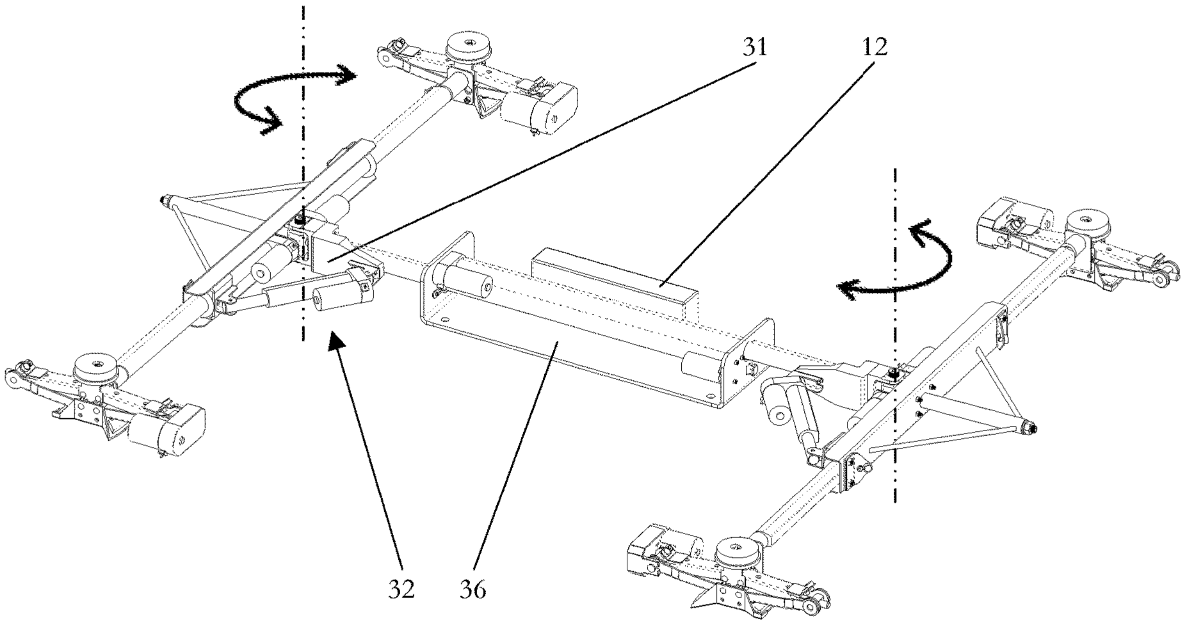
FIG. 19 is a perspective view of another embodiment.
Figure 20:
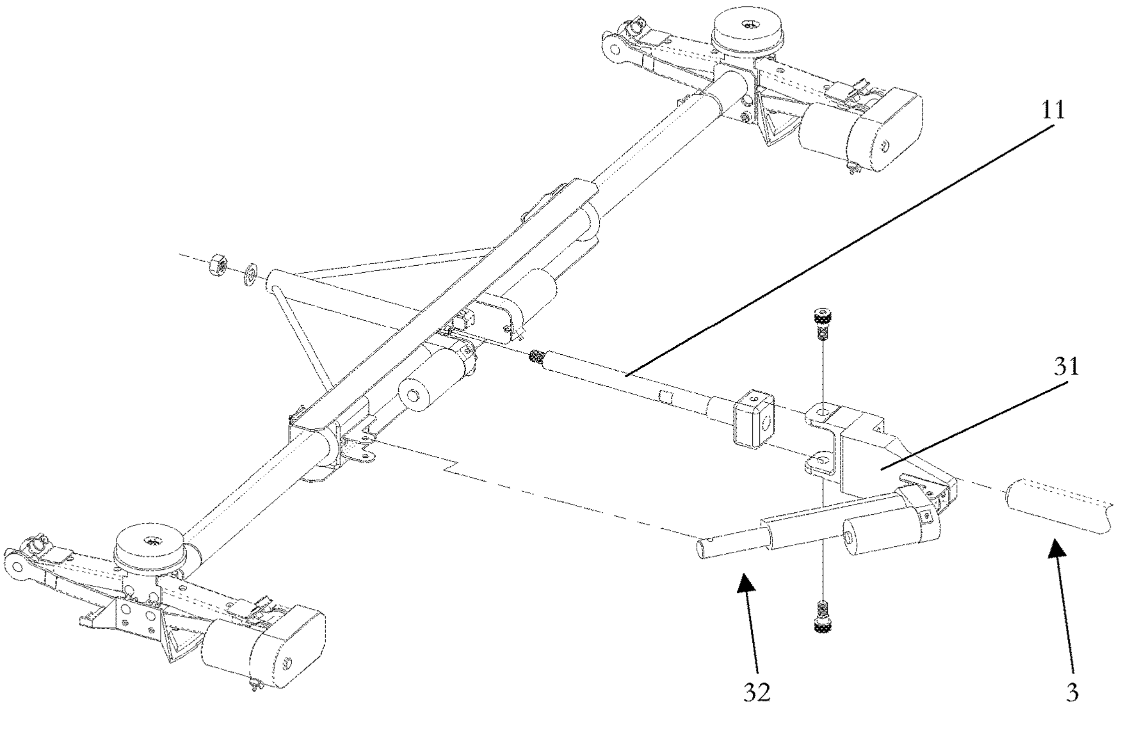
FIG. 20 is an exploded perspective view of the embodiment shown in FIG. 19.

As shown in FIG. 19 and FIG. 20, said driving device comprises seat 36, a pair of linear actuators 3, two deflection drive 32, a pair of frames 9, four transverse linear actuator 7, four jacks 5.

Said seat 36 is fixed upon parking surface 22, box 12 for containing control system can be mounted on seat 36. Each stator 39 of two longitudinal linear actuators 3 are mounted on the seat 36 parallelly and in opposite directions. Telescopic rod 4 of each linear actuator 3 is hinged to a frame 9, so a telescopic rod 4 can drive its corresponding frame 9 to move back and forth along its telescopic direction.

Each frame 9 connects to one stator of a joint shaft 11 either rigidly, or relative rotatably. If rotatably, said joint shaft 11 is inserted into the shaft tube 38 of the frame 9, and their relative axial movement is limited, so the frame 9 can rotate around the joint shaft 11 but can not move axially relative to the joint shaft 11.

The other end of each joint shaft 11 is hinged with a joint block 31 which is fixed with the end of a telescopic rod 4, joint shaft 11 can rotate around joint block 31 and rod 8 about a vertical axis, which means frame 9 can rotate about rod 8 about a vertical axis.

Each stator 40 of two transverse linear actuators 7 are mounted on a frame 9 in-line and in opposite directions. The telescopic direction of rod 8 (a moving end of the second or third linear actuator group) is angled to the telescopic direction of rod 3, for example perpendicular. The bottom face 6 of each jack 5 is fixed to the end of telescopic rod 8 of each transverse linear actuator 7, and the bottom face 6 (FIG. 3) of the jack 5 is above, sufficiently close to, and parallel to parking surface 22. Therefore, each transverse linear actuator 7 can drive its corresponding jack to move transversely relative to the seat 36 and maintain standing orientation of said jack.

Each end of a deflection actuator 32 is separately hinged to a telescopic rod 4 and corresponding frame 9, so that deflection actuator 32 can drive frame 9 to rotate relative to corresponding rod 3 about a vertical axis.

Therefore, the same, each jack can move both longitudinally and transversely relative to the seat 36, so any jack can reach multiple positions within a range of area on the parking surface 22 through its appropriate longitudinal and transverse movements, along with rotation of frame 9.

Each of said longitudinal linear actuator 3 and the transverse linear actuator 7 can detect the moving distance of their corresponding telescopic rods 4 and 8 relative to their corresponding initial point, and can send said moving distance signal to the control system. Initial point of the telescopic rod's travel can be set to a point where the telescopic rod retracts to a distance close to the starting peak, such as a distance of 10 mm, for easier setup or tune-up.

Similarly, an initial point can also be applied to deflection motor 13 or deflection actuator 32, for setting up the initial point of angular travel of related components.

Jacks

In current preferred embodiment, a plurality of independently deployable jacks 5 are used to lift target vehicle. As shown in FIG. 1, FIG. 2, FIG. 3, FIG. 13, each jack 5 compromises a bottom face 6, motor 15 and a contact pad 20. In working jack 5 stands vertically in which the bottom face 6 is horizontal. Jack 5 can be erected by motor 15 driving contact pad to move higher and be far away from bottom face 6, and jack 5 can also be retracted by operations to make contact pad 20 to move down toward bottom face after erected. The height of contact pad of each jack is independent to each other. Similarly, the travel of the contact pad 20 relative to bottom face 6 can also be set an initial point close to its bottom peak position as mentioned above.

Each jack has sensors that can send information to the control system about the height of the contact pad relative to its bottom face 6. For example, the motor 15 can send parameters of its movement from the initial point, such as the number of rotations of the output shaft, so that the control system can obtain through this signal the traveled height of each contact pad 20 starting from the initial points. Therefore, the control system can control the height of each contact pad top surface relative to bottom faces 6 of corresponding jack 5.

Imaging System

Imaging system comprises aiming devices and image capturing devices like cameras. Following is the introduction of aiming devices and their positioning point, orientation line:

In this Vehicle lifting robot, each jack has a corresponding aiming device, which has a predefined position relative to the jack. The aiming device can generate a type of pattern which can be superimposed with images output by the cameras to form positioning images, which can be used by the control system for positioning a lifting point on the vehicle underbody 24.

One type of the aiming devices is a pattern transmitter, and the other type is an aiming camera which is a combination of an aiming device and an image device like camera.

The pattern transmitter can project a type of pattern upwards, such as one or more laser spots, a circle, a crosshair, and so on. A positioning point which either have an actual shape in the pattern or is a virtual point without actual shape, is located at a predefined direction one and distance one relative to the above-mentioned pattern, for example, the center of the beam spot when there is only one laser spot, the center point of a circle, the center point of a regular polygon, or some kind of pattern. The positioning point can be located in an image with said pattern according to shown shape of the pattern in said image and the above-mentioned predefined relative direction one and distance one.

The output image of said aimable camera 41 has a predefined pattern, such as a crosshair, a circle, or the border of its output image. The position of the pattern relative to the body of the Aimable camera 41 is fixed. Similarly, the positioning point is located at predefined position relative to said pattern, such as the intersection of a crosshair, the center of a circle, the midpoint of a line segment, and so on. Said positioning point is located on the optical axis of the Aimable camera 41. Images with said pattern outputted from said aimable camera 41 can be used as positioning images.

For ease of clarify, in the following there are some actual or virtual technical feature hereinafter referred to as their corresponding technical phrases for image system and used thereafter:

Reference Point, Orientation Line, Reference Point Aligning, Offset Aligning

Reference point: Reference point is a virtual point with predefined relative position to the structure of the aiming device. If an aiming device has only one pattern emission point, the pattern emission point like center of its lens can be set as its reference point, If an aiming device has multiple pattern emission points, the position of its reference point can be at a predefined position relative to layout of said pattern emission points. A point on the optical axis of the aimable camera 41, can be defined as the reference point of said aimable camera.

As known from above, the reference point of a pattern transmitter or an aimable camera 41 has a predetermined direction two and a distance two relative to the corresponding jack, therefore each jack has its own reference point.

Orientation line: In the above-mentioned aiming device, the line connecting said positioning point in the shape of pattern projected by the pattern transmitter with the reference point of the pattern transmitter, or the optical axis of the aimable camera 41, is called Orientation line of aiming device.

Reference point aligning: When the above-mentioned Orientation line is vertical, in the process of vertically aligning a contact pad 20 with the corresponding lifting point, one jack moves with its corresponding aiming device. When the image of the lifting point and predefined pattern forms a positioning image, the control system firstly needs to analyze the relative position between the positioning point and the corresponding lifting point in the positioning image, and control the driving device to move corresponding jack appropriately according to the analyzed relative position. At the same time the control system keeps calculating real-time positioning image and keep fine-tuning the driving data of the longitudinal linear actuator 3 or the transverse linear actuator 7 accordingly, and finely adjusting the position of the reference point of corresponding jack, until finally in the positioning image the said positioning point is sufficiently close to the center of said lifting point, and the deviation distance is within the allowable range, so that the reference point is aligned vertically with the corresponding lifting point. This process can be called Reference point aligning.

Offset aligning: Then, according to said predefined direction two and distance two, driving device moves the center of the contact pad to vertically align with the prior position of the reference point, so that the jack contact pad can be vertically aligned with the corresponding lifting point. This process can be called Offset alignment.

There can be 3 types of relative position between the aiming device and the corresponding jack, following are their description, and the corresponding way to align a jack with a lifting point:

Vertical Offset-Free Aiming Device, and Vertical Aiming Device with Offset:

Vertical offset-free aiming device: When orientation line of an aiming device is vertical, said aiming device can be installed inside the contact plate 14 and their reference point is located at the center of the contact plate. So, said distance two is equal to 0. This configuration of the aiming device can be called Vertical offset-free aiming device. In this condition, the contact pad of a jack can be vertically aligned with the corresponding lifting point by simply performing the reference point aligning.

Vertical aiming device with offset: In another situation, orientation line of an aiming device is still vertical, but said aiming device can be installed at a position with predefined direction two and horizontal distance two relative to center of contact pad. In this case, said distance two is not equal to 0, such as 100 mm, this configuration of the aiming device can be called Vertical aiming device with offset. In this case, the reference point aligning needs to be performed firstly, and then the offset alignment is performed to align the jack with the corresponding lifting point.

Aiming Device Non-Vertical

When the orientation line of said aiming device is set not vertical, the height and distance of the point on the surface of vehicle underbody 24 corresponding to the positioning point in the pattern on positioning image, need to be measured, and relative direction and distance between the vertical line passing the lifting point and center of corresponding contact pad can be obtained through calculations by way such as trigonometric functions. Finally, with calculation result the control system operates the driving device to move each jack directly below its corresponding lifting point.

The process based on this method can be very complex, however it can also work for the case of Aiming device vertical.

Arrangement of Image Capturing Devices

Figure 3:
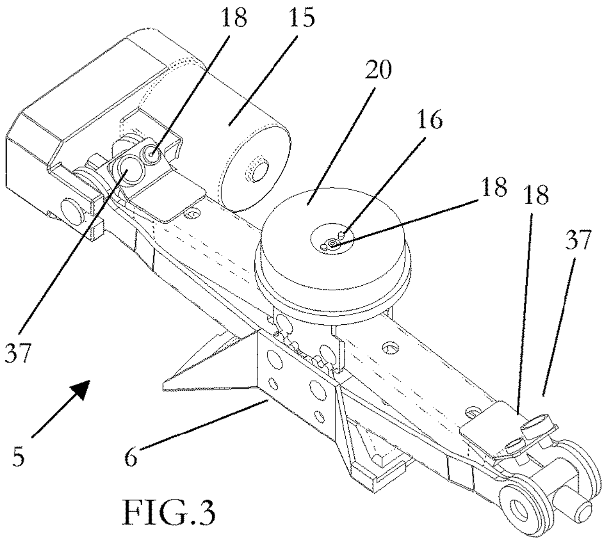
FIG. 3 is a perspective view showing the structure and parts of one type of jack used in the Vehicle Lifting Robot.

In the preferred embodiment, each jack has a corresponding image capture device, such as a camera, and said image capture device has a fixed position relative to the jack. As shown in FIG. 3, the camera 18 of the image capturing devices is installed in the contact pad of a jack.

In some other cases, the image capturing devices can also be installed in other positions in other suitable quantities. The principle is that in any case, a certain area around each lifting point on the target vehicle underbody 24 can be photographed by at least one image capture device.

When the control system analyzes said positioning images each of which includes an image from a camera of an image capturing device. It can be necessary that control system knows the orientation of each said image from a camera. Orientation of an image is decided by the camera output it. Therefore, each of said image capturing device can be installed according to predefined orientations which are also input into the control system as control parameters, or, in other case if the actual orientation of any image capturing device is either not correct or not known by the control system, the control system can carry on some calibration steps to move a corresponding aiming device along a predefined direction, then control system can analyze the corresponding positioning image, to check the moving direction of said positioning point and compare it with said predefined moving direction of said aiming device, so that the control system can refresh the control parameter about the orientation of said image capturing device.

Further Supplement and Optimization to the Image System

As a further supplement and optimization to the image system, some technical solutions are shown as the following:

As shown in FIG. 3, the image system further includes at least one light 37. In preferred embodiment, said light 37 is connected to each jack and facing upward. When a jack is under the vehicle underbody 24 and the illumination level is insufficient, the above-mentioned light 37 can be turned on to illuminate a certain area of the vehicle underbody 24 around the contact pad 20, so that when necessary, adequate lighting can be provided for related cameras.

In addition to the above-mentioned lights used to illuminate the bottom of the vehicle, appropriate lighting devices (not shown in the figure) can be installed in appropriate areas around the Vehicle lifting robot, such as below the parking surface 22 (inside of the platform 21). When lifting a vehicle, corresponding lighting devices can be turned on to illuminate the underbody or other parts of the vehicle that need to be illuminated with appropriate brightness and angle.

As shown in FIG. 3, the image system further includes at least one camera for assisting image capturing.

Appropriate dust covers or dust removal devices (not shown) can be added to some or all of the cameras 18, 19, special pattern transmitters 17 or laser transmitters 16, and lights 37, which can be turned on or off as needed, in order to prevent the above-mentioned components from fault caused by dust, or if necessary, the dust covering the above-mentioned components can be cleaned for proper work of said components.

In addition, a 2D or 3D scanners and corresponding lights (not shown in the figure) can be installed at the appropriate position on the Vehicle Lifting Robot or on the platform 21. When the vehicle enters parking surface, said 2D or 3D scanners can scan the moving or stopped vehicle underbody 24 to generate 2D or 3D data of the vehicle underbody 24, which can be sent to the control system for analysis to detect the positions of lifting points, or status of the components on the underbody of the vehicle.

In order to monitor the healthy status of the Vehicle Lifting Robot itself, the control system can detect respective displacements and angle changes of some key components of the itself caused by the actions of the said motors or driving device.

In said apparatus for automatically lifting a vehicle, the image system comprises the aiming devices and the image capturing devices, each said jack has at least one aiming device, said aiming device can generate pre-defined pattern, the image output by the above-mentioned image capturing device can generate real-time positioning images each of which containing said pattern generated by aiming device and an image of a part of the vehicle underbody in the control system, in said positioning image a positioning point can be predefined to be at the position with predefined direction one and distance one relative to the shape of said pattern, each said aiming device is located at a predefined direction two and distance two relative to the corresponding jack.

Said control system can analyze the positioning images in real time to calculate the relative position data between the positioning point and the corresponding lifting point shown in said positioning images, and then move corresponding jack according to said position data through said driving device, so that the real-time positioning images can show said pattern and said lifting point have predefined position relationship, and then the control system can calculate according to said predefined position two and distance two and said predefined position relationship, then control the driving device to appropriately move the corresponding jack accordingly, so that the center of the contact pad of said jack can be vertically aligned with the corresponding lifting point, said pattern, predefined direction one and the distance one, and the predefined direction two and the distance two can be input into the control system as its control parameters.

Embodiments of the Image System

In order to illustrate the image system, the embodiments of imaging system with vertical offset-free aiming devices are shown as following:

Embodiment 1 of the Image System: Centered Aiming Device and Camera

In this embodiment, pattern transmitter is used as aiming device, projected pattern and shape of vehicle underbody 24 are captured by the same camera.

As shown in FIG. 3: the aiming device of the image system is a pattern transmitter 16, and the image capturing device includes at least one camera 18, the pattern transmitter 16 and the camera 18 are both fixedly mounted on the center of the contact pad 20 of a jack.

The pattern transmitter 16 with vertical orientation line, projects a predefined pattern formed by laser, visible light, infrared, or other types of electromagnetic waves, that is, in the pattern shown on the vehicle underbody 24, the line connecting the positioning point having a predefined position relative to said pattern with the emission point of the pattern transmitter 16 is vertical.

The shape of the vehicle underbody 24 with the shape of the pattern projected by the aiming device 16 can be captured and output to control system as positioning image by the camera 18.

Therefore, the above conditions fulfill the definition of Vertical offset-free aiming device, so only the operation of Reference point aligning needs to be performed, to make the corresponding contact pad to align vertically with its corresponding lifting point.

As shown in FIG. 3, the above-mentioned pattern transmitter 16 can be a laser pointer, said laser pointer can have 2 laser emission points, which can emit two small diameter laser beams vertically upward, so that two small laser spots can be projected toward the vehicle underbody 24. The camera 18 placed in the center of contact pad 20 can capture the image projected upon the vehicle underbody 24 by said laser pointer, and the midpoint of the line connecting said two small laser spots can be defined as the positioning point by control system in advance.

As a simpler solution, the above-mentioned pattern transmitter which is a laser pointer, can also project vertically only one laser beam to form only one laser spot on the vehicle underbody 24, said one laser spot can be directly used as positioning point.

In the above two cases where the aiming device employs a laser pointer, the reference point vertically aligns with the center of the contact pad of the jack, and the distance two is 0, which fulfill the definition of Vertical offset-free aiming device, so only the operation of reference point aligning is required, to make the corresponding contact pad 14 and its corresponding lifting point to be directly aligned vertically.

Embodiment 2 of the Image System: Special Pattern Transmitter and Dedicated Graphic Sensor In this embodiment, special pattern transmitter 17 as aiming device, its pattern can only be captured by a dedicated graphic sensor 19.

Figure 4:
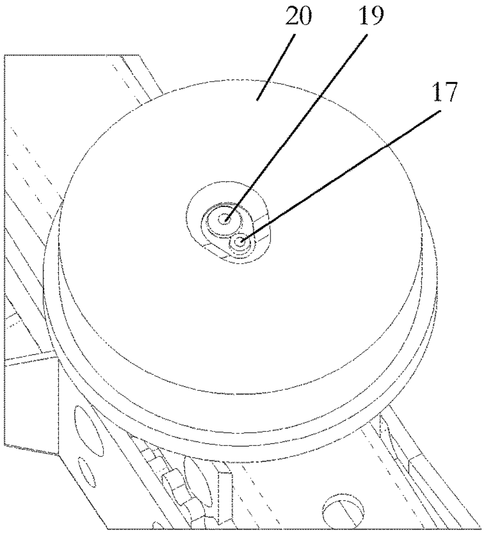
FIG. 4 shows a special pattern transmitter and a dedicated graphic sensor on the contact pad of a jack used in the Vehicle Lifting Robot.

As shown in FIG. 4, the aiming device of the image system is a special pattern transmitter 17, and the image capturing device comprises a dedicated graphic sensor 19 and at least one camera 18 (Not shown in FIG. 4).

The special pattern transmitter 17 and the dedicated graphic sensor 19 are both installed in the center of the contact pad 20. Between the dedicated graphic sensor 19 and the camera 18 there are predefined orientation and distance relative to each other.

The special pattern transmitter 17 can project a predefined pattern upward using a special electromagnetic wave, such as ultraviolet rays, and similarly, its orientation line is vertical.

The pattern projected by special pattern transmitter 17, such as a pattern formed by ultraviolet rays, can only be detected by the dedicated graphic sensor 19 and generates an output pattern image.

The camera 18 is used for capturing and outputting a image of vehicle underbody 24, but not able to capture said pattern.

An image of the pattern and an image of vehicle underbody 24 captured synchronously can be superimposed as positioning image according to said predefined orientation and distance between the dedicated graphic sensor 19 and the camera 18. Then, according to multiple positioning images, the control system can perform reference point aligning, wherein the special pattern transmitter 17 projects a predefined pattern to the vehicle underbody 24, a predefined positioning point can be found from said pattern, and there is said positioning images.

Embodiment 3 of the Image System: Aimable Image Capturing Device

Figure 21:
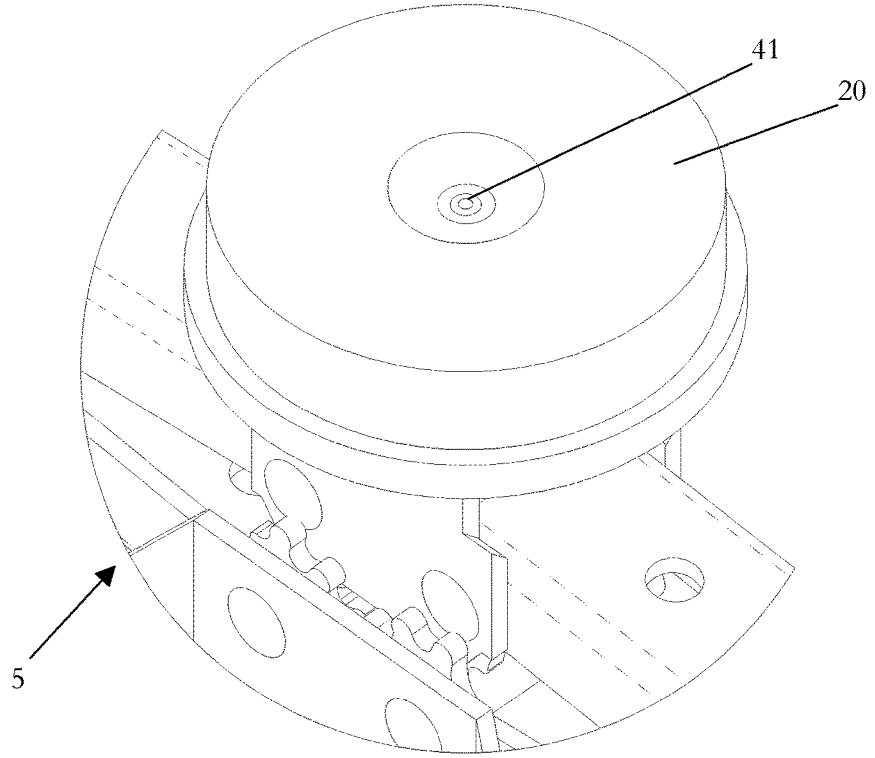
FIG. 21 shows an Aimable camera is installed in the center of a contact pad of a jack.

As shown in FIG. 21, the image system can be an aimable image capturing device, or called an aimable camera 41, as the combination of an aiming device and an image capturing device, whose optical axis is vertically placed and passing center of contact pad 20.

Said aimable image camera is placed at the center of the corresponding contact pad 20 and faces directly upward. The control system can use the image captured by the aimable image camera, to analyze in real-time the relative position between the orientation line and corresponding lifting point, then perform reference point aligning, so that the corresponding contact pad is vertically aligned with its corresponding lifting point.

In the above embodiments, various pattern transmitters and cameras are installed in the center of each contact pad 20. Therefore, each contact pad 20 has corresponding accommodating slot for accommodating each component, and each component is fixedly installed inside said accommodating slot, and the highest point of each component is appropriately lower than the top of corresponding contact pad, to prevent the components from contacting the vehicle body during the process of lifting the vehicle, to avoid damage caused by the components being squeezed or collided by vehicle body.

The above embodiments are the cases where the aiming device is vertically placed and offset-free.

In the case where any aiming device is vertically placed with offset from center of corresponding jack, compared to the above embodiments, the structure and orientation of the aiming device are unchanged, but its installation position is at a certain distance from the center of corresponding contact pad, that is, it is a vertical aiming device with offset. In this case, it is necessary to perform reference point aligning for corresponding jack, and then perform offset aligning, so that said contact pad 20 can vertically align with corresponding lifting point.

In one embodiment, all cameras in the image system are installed in predefined orientations which are also inputted into the control system as control parameters.

In another embodiment, said control system can automatically generate or refresh the control parameter about the actual orientation of each corresponding camera of the in the image system, by moving a corresponding aiming device along a predefined direction and taking corresponding positioning images, then control system can analyze said positioning images to get the moving direction of corresponding positioning point relative to corresponding positioning image, then compare it with said predefined moving direction of said aiming device to get the angle between said moving directions.

In another embodiment, the image system can be a ‘hybrid’ image system, which contains more than one type of positioning image generating solution shown in previously mentioned embodiments. That is, different image capturing solution can be applied to different jacks. For example, in one of 4 jacks, the pattern transmitter and camera are placed at center of the contact pad, however, an aiming camera is placed a distance away from the contact pad of another jack, and other image capturing solutions can be applied separately to the left jacks. In this case, contact pad of each jack can align with the lifting point by the way corresponding to the type of image system applied to said jack.

Process of Lifting a Vehicle

With the vehicle lifting robot in the present invention, the control system can operate and navigate the driving device to move the jacks 5 horizontally so that the lifting points on the parked vehicle underbody 24 can be aligned with the contact pads 20 of corresponding jacks, then operate said jacks to lift target vehicle to desired height, or then lower it to desired height.

One of the preferred methods or process is described as following:

S1. Standby:

The contact pads 20 of all the jacks are lowered to the lowest height of initial point positions, and all jacks are driven inwardly to be nested at their initial point positions by the driving device.

Figure 7:
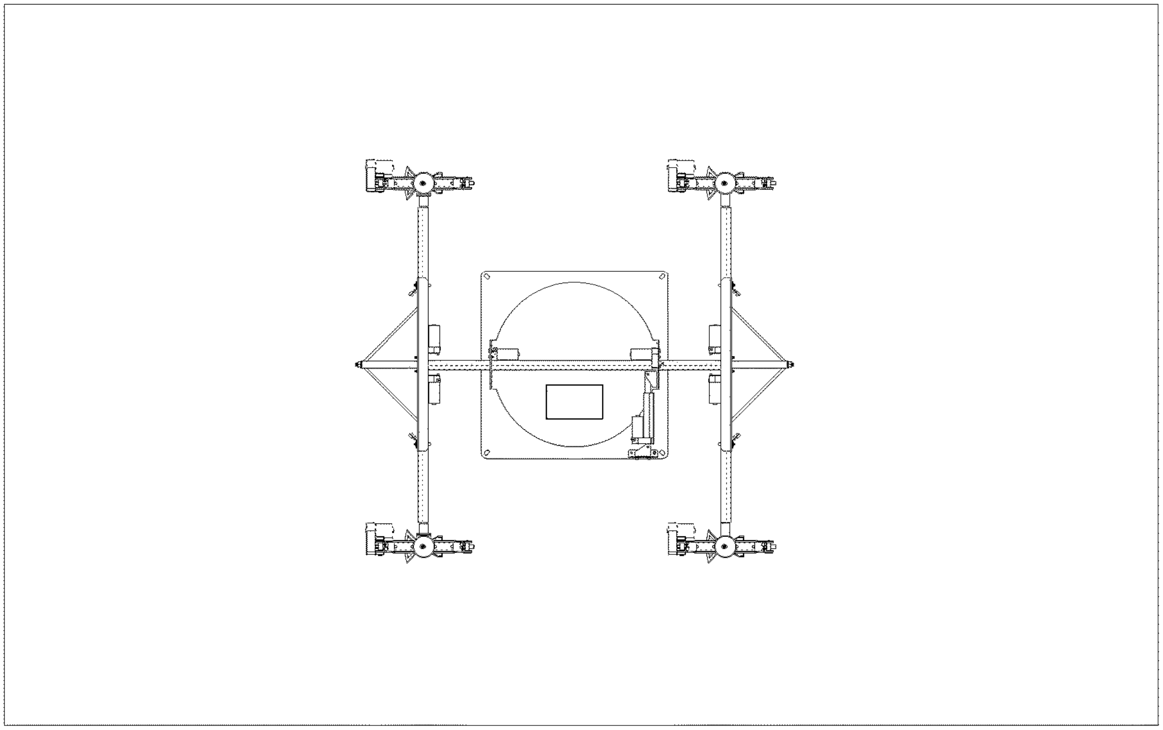
FIG. 7 is a top view of a nested or standby Vehicle Lifting Robot mounted on a platform.
Figure 8:
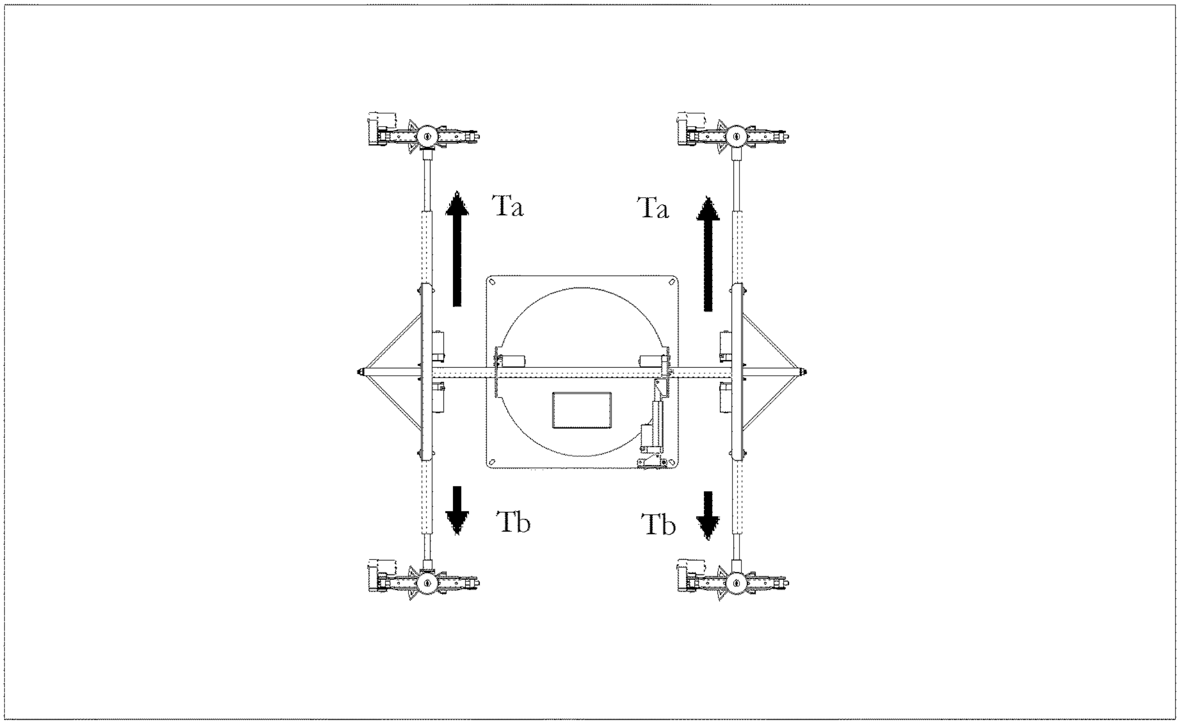
FIG. 8 is a top view of the Vehicle Lifting Robot with 2 jacks on one side transversely moved outward a displacement Ta, and other 2 jacks on another side transversely moved outward a displacement Tb, but Ta is larger than Tb.

As shown in FIG. 7, in the standby state, Jack orientation vector 30 of the Vehicle Lifting Robot can be set parallel to and in the same direction as the Designated driving direction vector 28, so that the Jack azimuth 34 is set to be zero during standby, that is, the telescopic rod 4 of linear actuator 3 is parallel to Designated driving direction 27. At this time, all jacks are retracted to the initial point with the lowest height to occupy the minimum space, and all linear actuators 5 and 7 are retracted to their initial points, so that Vehicle Lifting Robot is in a nested standby state to occupy the minimum area and space, therefore, components of the car lifting robot will not block the movement of the vehicle body and wheels.

S2. Data Receiving:

When Vehicle Lifting Robot receives a command to lift a certain type of target vehicle through the wired or wireless data exchange channel, detailed technical information of the target vehicle can be then or already been transferred and stored in the control system. These detailed technical information can include, but are not limited to, VIN number, vehicle weight, axle weight, wheelbase, track of front wheels and rear wheels, body width, the height of the vehicle underbody 24, and information about the target underbody 24 (FIG. 6), such as its images, sizes, shapes, and information of each lifting point such as the shape, standard height above the ground, relative position to the underbody of the vehicle, etc.

S3. Parking

As shown in FIG. 5 and FIG. 6, after a time, or at the time as step 2 ongoing, the target vehicle 1 (FIG. 17) is driven onto the parking surface and parked above a Vehicle Lifting Robot.

After said vehicle is parked, center position of its lifting points area should be as close as possible to center of vehicle lifting robot, so that its lifting points can be within the moving range of the corresponding jacks and ca be accessed by a jack.

Figure 10:
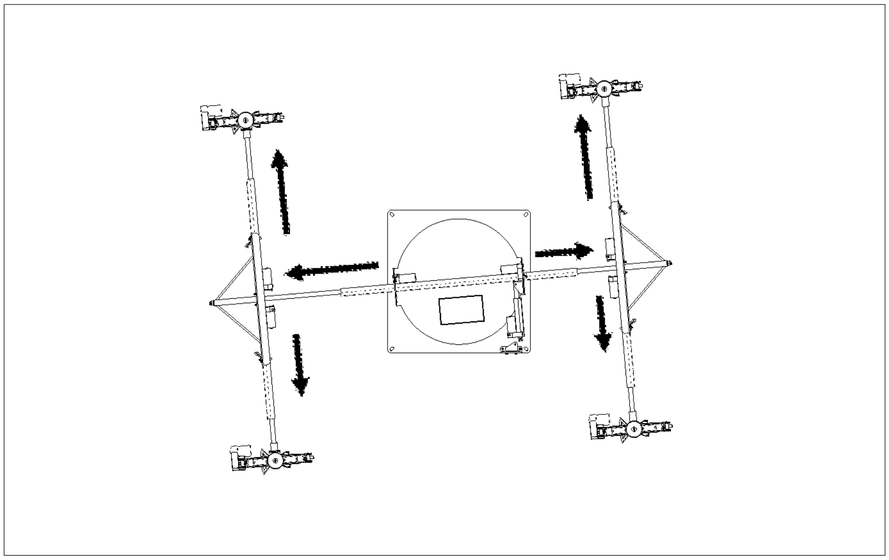
FIG. 10 is a top view of the Vehicle Lifting Robot with a first longitude linear actuator moving toward one end, and the other longitude linear actuator moving toward the opposite end, and displacement of said first and the other linear actuators are different. Compared to FIG. 7, the orientation of the longitude linear actuator and the transverse position of the jacks have been changed.
Figure 11:
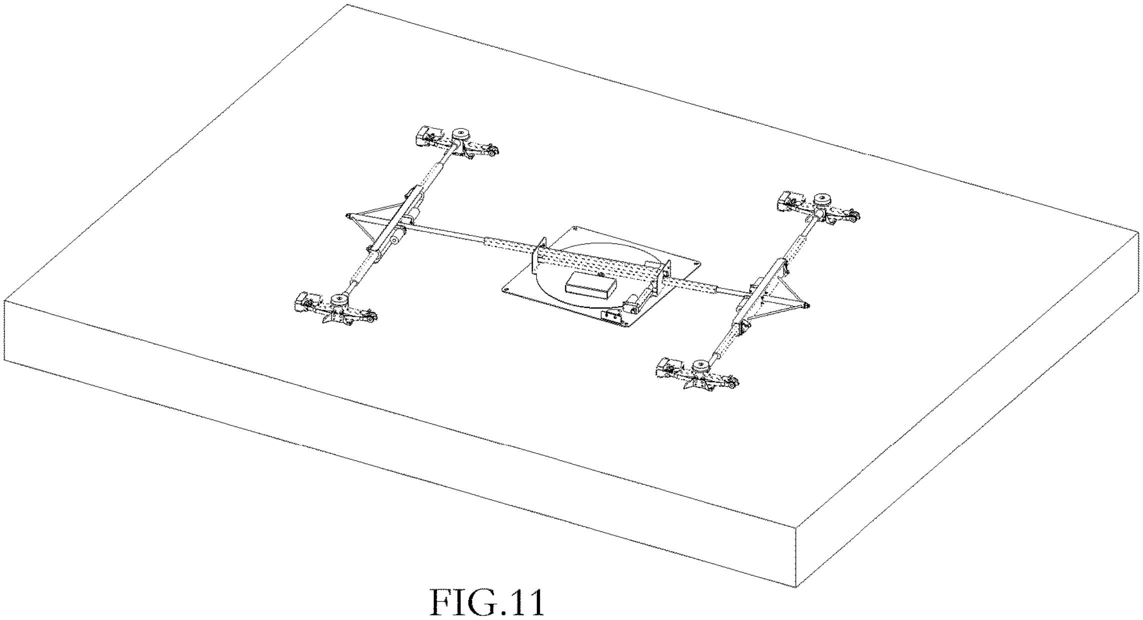
FIG. 11 is a perspective view showing the Vehicle Lifting Robot with nested jacks corresponding to the status shown in FIG. 10.
Figure 12:
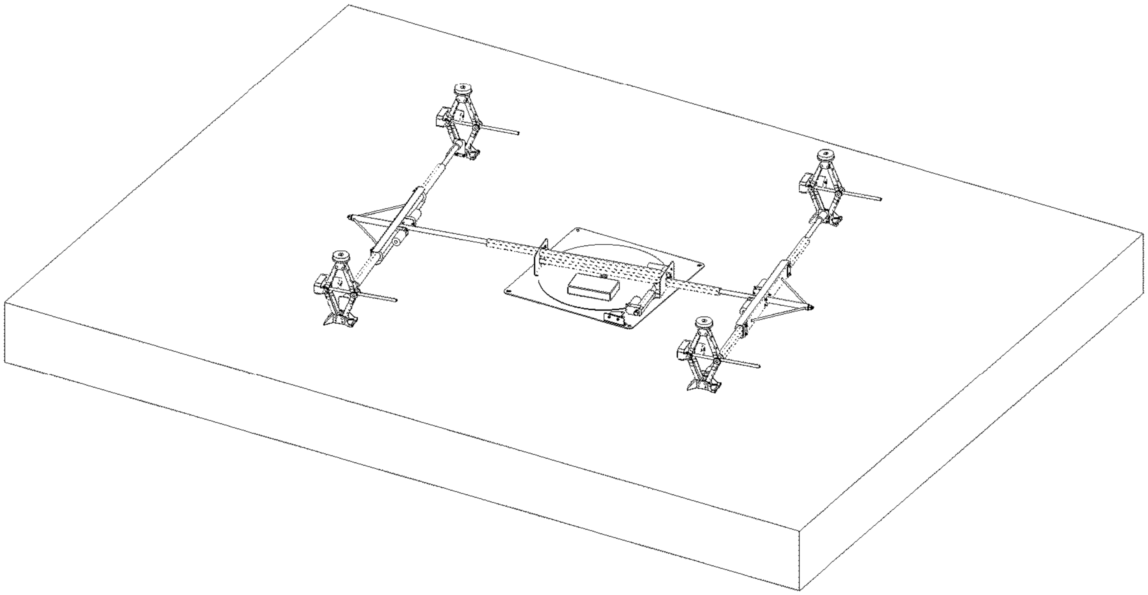
FIG. 12 is a perspective view of the Vehicle Lifting Robot wherein the jacks are erected after changing of jacks' position.
Figure 13:
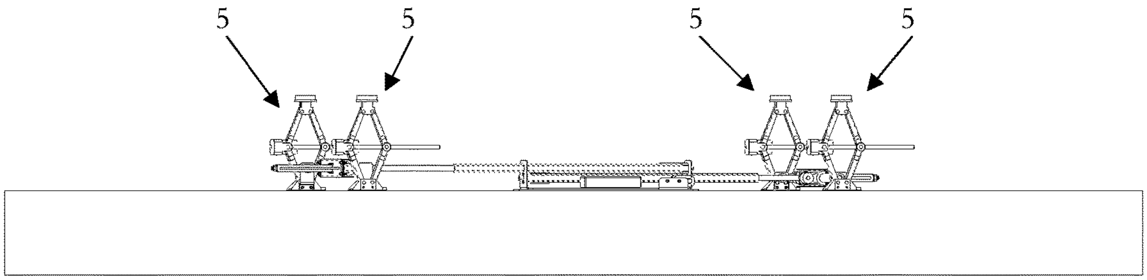
FIG. 13 is a side view of the Vehicle Lifting Robot with erected jacks shown in FIG. 12.

S4. Image Capture:

Image system is turned on to capture images of target vehicle body and underbody. As shown in FIG. 2 and FIG. 10, all transverse linear actuators 7 move the jacks outwardly with their cameras and lights turned on, other appropriate lighting equipment will be turned on also, in order to capture images containing shape of underbody 24 (FIG. 6) and side edges of vehicle body.

S5. Find Out Parking Azimuth 33:

When image system captured images containing underbody, left and right sides of the vehicle body 23 (FIG. 6), the control system will analyze said images, accompany with comparing said images with the relevant images of the body received in advance, to find the Vehicle Longitudinal middle plane 26 and Parking azimuth 33 of the target vehicle 35, and the horizontal traveled distance of each jack can be analyzed also, to find out: the relative direction and distance between Vehicle Longitudinal middle plane 26 and centerline of turntable 2, relative position between underbody and centerline of turntable 2, and so on.

S6. Adjust Jack Azimuth 34:

As shown in FIG. 9, according to the Parking azimuth 33 of the vehicle obtained in step 5, the deflecting motor 13 rotates the turntable 2 to make Jack azimuth 34 equal to Parking azimuth 33, so that the Jack orientation vector 30 is parallel to and in the same direction as Vehicle orientation vector 29.

In another embodiment, longitudinal linear actuator 3 is fixedly jointed to the parking surface 22, and frame 9 can horizontally rotate around frame 9. In this embodiment, in this step, orientation of each frame 9 can be adjusted, to make telescopic direction of rod 8 perpendicular to Longitudinal middle plane of target vehicle.

S7. Search Lifting Points

As shown in FIG. 10, the driving device moves the four jacks, and uses image capturing devices to capture images of the underbody 24, and then the control system can compare the captured images with images with shape of vehicle underbody 24 and its lifting points previously stored in the control system, to find out the position data of the lifting points relative to the vehicle lifting robot.

Another way of searching lifting points is, the control system may use machine vision and other software to determine the positions of the lifting point relative to underbody based on the image of the vehicle underbody 24 captured in step S4, and previously received and stored data, and analyze position data of each lifting point relative to the vehicle lifting robot.

S8. Reference Point Aligning

According to the position data obtained in S7, the control system makes the driving device to drive each jack to the target coordinate value. When any jack approaches the corresponding lifting point from below, its aiming device can start to project a pattern upward, and the image capturing device takes pictures of vehicle underbody 24 to obtain positioning images containing predefined pattern, or the Aimable camera 41 start to capture and output positioning images containing predefined pattern, and then the control system starts to do reference point aligning for said jack, then one by one, the reference points of all related jacks are finally aligned with corresponding lifting points.

S9. Offset Aligning

When the aiming device of any jack is not installed at the center of its contact plate 14, said jack needs to be performed offset aligning, to make the center of its contact pad to be on the vertical line passing previous position of reference point, so that all lifting points can be vertically aligned by contact pads of corresponding jacks.

Instead, when the aiming devices corresponding to all the lifting points on the underbody are all installed at the center of corresponding contact pad, this step S9 can be skipped and proceed directly to the next step.

S10. Lifting

The control system operates related jacks to move their contact pad 20 up, therefore to lift the target vehicle to a specified height.

S10.1 Activation:

Then motor 15 of the jacks will be activated to raise their contact pads 20 from the initial point, and the sensor can send the travel signal of each contact pad 20 to control system, so that the control system can obtain the traveled height of a contact pad from the initial point through said signal. Therefore, the control system can control the height of the upper surface of the lifting pad relative to the bottom surface of the jack.

S10.2 Contact:

The control system can detect the moment when a contact pad 20 starts to contact the corresponding lifting point 25 on the underbody 24, so that when any contact pad comes into contact with the lifting point and loaded by vehicle underbody earlier than any other contact pad, the control system suspends the rising of said loaded contact pad, until all the contact pads are in contact with the corresponding lifting points, all the pads will then rise synchronously.

There are various methods for detecting a contact pad 20 contacting the corresponding lifting point 25, such as a limit switch, machine vision monitoring, or monitoring parameter changes such as current and voltage of the jack motor 15 due to change of its load, etc.

The execution process of step S10.2 can also include a fault detection method, the steps of which are as follows:

S10.2.1. Obtain on-site height of the lifting points: When the contact pad 20 touches the corresponding lifting point, the control system can detect the height value of the top of each contact pad from the parking surface, which is, the on-site height of each lifting point relative to the parking surface.

S10.2.2. Comparison: The control system can compare said on-site height of each lifting point with the height value standard of the lifting points received in advance. When the on-site height value of a lifting point exceeds or falls below the standard height value, it indicates that the target vehicle is faulty and the control system can send corresponding fault information out and wait for further instructions; otherwise, go to the next step.

S10.3. Lifting Up and Maintain Attitude:

The control system continues operating related jacks to lift the target vehicle, and also monitors and adjusts the ascent speed and travel of each contact pad in real-time, so that the travel of each lifting point of the target vehicle is kept consistent, and said vehicle can maintain a stable and safe attitude.

S10.4. Reach Desired Height and Lock:

During the operation of each related jack 5, a corresponding wheel position camera and lighting module 14 (FIG. 2) located on the bracket 6 can take images of each corresponding wheel, and the control system can determine whether the tread of the wheel is free from the parking surface, and how high it leaves the parking surface. The control system can also detect height of each lifting point in real-time, which means the height of the vehicle body. When the above-mentioned height reaches the desired height value, the control system will stop each jack and keep target vehicle body at a height.

Each jack may also have a safety locking mechanism so that its contact pad 20 does not drop due to the huge pressure from the vehicle.

After any contact pad 20 contacts the corresponding lift point 25 on the vehicle body, as the height of the contact pad increases, the force from the vehicle body will press the corresponding jack down to the platform 21. Regardless of whether the bottom of the jack is in close contact with the surface of the platform 21 in the standby state, when the above-mentioned force is large enough, the bottom of the jack will contact and compress the surface of the platform 21 so that the platform 21 generates a upward reaction force to the jack. The upward reaction force enables said jack to maintain a balanced force state and be temporarily fixed.

S11. Descend:

When needs to lower the vehicle body to a desired height, if each jack has safety lock mechanism, the control system can firstly operate these safety lock mechanisms to release. Then, the control system operates related jacks 5 to lower their corresponding contact pad, when the vehicle body reaches the specified height, stop lowering and activate the safety lock mechanism again.

S12. Nest Back to Standby State:

The control system executes the lowering operation to lower the corresponding contact pads to initial point height, and drives all jacks inwardly to their initial point positions through the driving device, thereby returning to the standby state.

In the above step 1, during standby, the telescopic direction of rod 3 of linear actuator 3 is parallel to the Designated driving direction 27. In the above step 6, the deflection motor 13 rotates the turntable 2 so that the Jack azimuth 34 is equal to the Parking azimuth 33 of the car, to make Jack orientation vector 30 to be parallel to and in the same direction as the Vehicle orientation vector 29.

In another embodiment, in the standby state in step 1, telescopic direction of the rod 3 of linear actuator 3 may be set to be perpendicular to the Designated driving direction 27, and the jack orientation vector 30 is defined to be perpendicular to telescopic direction of the rod 3, pointing from the rear of the target vehicle to the front.

In another embodiment, the Vehicle lifting robot is suitably equipped with some vehicle servicing device, such as sensors, suitable robotic arm loaded with automatic fastener loader, or other tools, etc., which can be used for vehicle maintenance works, such as wheel alignment, brake system maintenance, oil change, etc.

Figure 22:
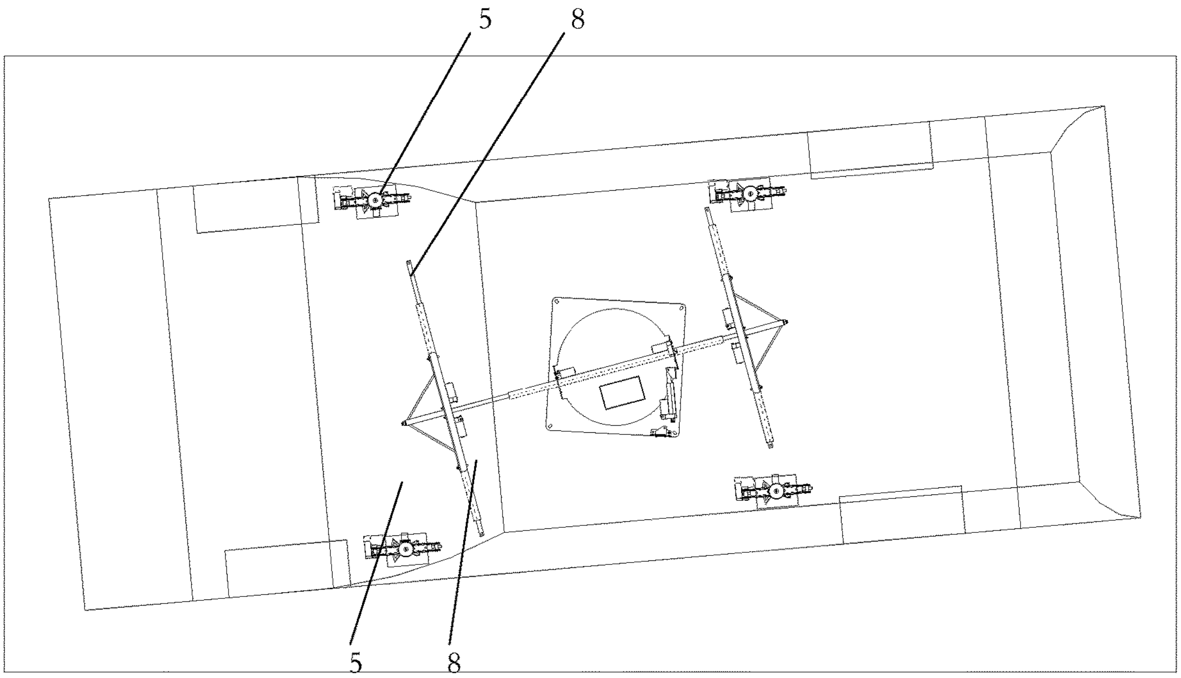
FIG. 22 shows pluggable jacks are unplugged from telescopic rods and driving device deflected.

In another embodiment, as shown in FIG. 22, suitable servicing devices such as sensors or tools can be installed on one or more telescopic rods or the other components of the Vehicle lifting robot, and at least one jack is connected to driving device with pluggable connection as a pluggable jack. When all jacks are free to move horizontally, said equipped servicing device can move around to access different area of vehicle underbody driven by the driving device to execute servicing work for a not lifted vehicle parked above the Vehicle Lifting Robot.

When one or more said pluggable jacks is loaded by the weight of a vehicle above and pinned between the vehicle underbody and the parking surface, the corresponding telescopic rod can retract so that said pinned pluggable jacks can be unplugged to free the movement of said telescopic rods, so that the corresponding portion of driving device can be free to move corresponding servicing devices thereon. In the case that all jacks of the Vehicle Lifting Robot are pluggable, when a vehicle is lifted by the Vehicle Lifting Robot, all jacks can be unplugged from the driving device to free the motion of the driving device for moving the servicing device around freely. When need to retrieve a pinned pluggable jack, the corresponding telescopic rod can be moved by driving device to aim at said pluggable jack then be extended to plug with said pluggable jack, then retract said pluggable jack to make it free to move horizontally.

In another embodiment, the Vehicle lifting robot can be used to lift only one lifting point of the target vehicle, according to the command or requirement of the task. This can be achieved by only erect the corresponding jack after it is vertically aligned with said lifting point.

Other variations and modifications will be apparent to those skilled in the art. The embodiments of the invention described and illustrated are not intended to be limiting. The principles of the invention contemplate many alternatives having advantages and properties evident in the exemplary embodiments.

What claimed is:

1. Apparatus for lifting a vehicle comprising a plurality of jacks, and at least one driving device, wherein said driving device comprises a base seat fixed to a parking surface on which said vehicle is parking, at least three linear actuator groups each of which comprising two linear actuators whose telescopic directions angled to each other and also each of the two linear actuators include a stator end and a moveable end, the stator ends of said two linear actuators in a same linear actuator group are jointed together, wherein the movable end of one linear actuator in a first linear actuator group of the three linear actuator groups is connected with the stators of the a second linear actuator group of the three linear actuator groups, and the movable end of another linear actuator in the first linear actuator group is connected with the stators of a third linear actuator group of the three linear actuator groups, at least one of the jacks is connected to the movable end of at least one linear actuator in the second linear actuator group and the third linear actuator group respectively.

2. The apparatus as claimed in claim 1, wherein each said jack comprises at least one driving actuator, and a contact face for directly contacting said vehicle, the driving actuator is operable to drive the contact face of the respective jack to move vertically independently of the other jacks.

3. The apparatus as claimed in claim 2, further comprising a control system and an image system, said control system is operable to exchange data with an outside world and store data, said data includes at least one of commands, setup information, characteristic parameters and images of vehicles, said image system is configured to capture at least the images above the jacks, said control system is configured to analyze and compare the captured images with the received data and obtain results, with said results said control system is operable to navigate said driving device to move related ones of the jacks, so that each of at least two lifting points of said vehicle is capable to be vertically aligned by a respective ones of the jacks below, said control system is operable to operate the jacks to alter a height of the vehicle.

4. The apparatus as claimed in claim 3, further comprising at least one height sensor configured to detect a height of the contact face relative to the parking surface, and a result of a height detection is operable to be collected by the control system.

5. The apparatus as claimed in claim 3, wherein the image system comprises at least one aiming device on at least one of the jacks, at least one respective pattern capturing device and at least one respective image capturing device which are located in a predefined locating relationship relative to the respective jack, a parameter of the locating relationship comprising at least one of direction, distance and orientation, the at least one aiming device is operable to project predefined pattern onto an underbody of the vehicle, said predefined pattern is configured to be captured by the respective pattern capturing device, the at least one image capturing device comprising at least one camera, based on said predefined locating relationship, an image output of the pattern capturing device and an image output of the image capturing device are superimposed to generate real-time positioning images at least one of which contains a shape of the predefined pattern and an image of an area of the vehicle underbody, said positioning images is configured to be collected by the control system.

6. The apparatus as claimed in claim 5, wherein each of said image capturing device is configured to be installed in a predefined orientation, said orientation is collected by the control system as control parameter.

7. The apparatus as claimed in claim 5, wherein the positioning image comprising a predefined positioning point located at predefined distance one in predefined direction one relative to the shape of said pattern, each said aiming device of the jacks is located at a predefined distance two in predefined direction two relative to a center and orientation of the contact face of the respective jack, the control system is operable to analyze the positioning images in real-time including comparing the positioning images with the received images of the vehicle, to calculate relative position data between the positioning point and the respective lifting point shown in said positioning images, and then move respective ones of the jacks with said driving device according to said relative position data until at least one real-time positioning image shows the positioning point coincides with said lifting point, then the control system operates the driving device to move the respective jack a composition distance of said predefined distance one and distance two, in a composition direction of said predefined direction one and direction two, thereby the center of the contact face of said jack is vertically aligned with the respective lifting point, the predefined pattern, the predefined distance one, direction one, and the predefined distance two, direction two are configured to be input into the control system as its control parameters.

8. The apparatus as claimed in claim 7, wherein the aiming device comprises at least one pattern transmitter operable to project the predefined pattern upwards, the image capturing device is used as the pattern capturing device.

9. The apparatus as claimed in claim 8, wherein said pattern transmitter is a laser transmitter placed at the center of the jack contact face and operable to project at least one laser beam vertically upward.

10. The apparatus as claimed in claim 7, wherein the aiming device comprising at least one special pattern transmitter operable to emit a type of electromagnetic wave to project the predefined pattern upward, said pattern capturing device is operable to capture the image of the pattern projected by said special pattern transmitter.

11. The apparatus as claimed in claim 7, wherein the camera of the at least one image capturing device is also an aiming device and a pattern capturing device, said camera as an aiming device and a pattern capturing device is operable to directly generate a pattern in the images outputted by said camera, said images are the positioning images.

12. The apparatus as claimed in claim 11, wherein the positioning point of said pattern is located on an optical axis of said camera.

13. The apparatus as claimed in claim 7, wherein the control system is operable to update a control parameter about an actual orientation of each image capturing device, by moving a respective one of the aiming device along a predefined direction and taking respective positioning images, then control system is configured to analyze said positioning images to get a moving direction of the respective positioning point relative to the respective positioning image, then compare it with said predefined moving direction of said aiming device to get an angle between said actual orientation of each image capturing device and said moving directions.

14. The apparatus as claimed in claim 3, wherein said image system further comprises at least one illumination lamp and at least one camera for assisting image capturing, wherein said at least one camera is mounted at a predefined location.

15. The apparatus as claimed in claim 1, wherein said driving device comprises a turntable and a deflection motor, said first linear actuator group is mounted on said turntable, said turntable is rotatably installed on the base seat, said deflection motor is configured to drive said turntable and said first linear actuator whereon to rotate around said base seat, therefore said jacks are operable to rotate around a vertical axis.

16. The apparatus as claimed in claim 1, wherein the driving device comprises at least one deflection actuator, the stator ends of both linear actuators in the first linear actuator group are fixed to said base seat, at least one of the remaining second and third linear actuator groups is configured to be driven by said deflection actuator to rotate relative to a respective one of the moving ends of one of the linear actuator in the first linear actuator group about an axis perpendicular to said parking surface.

17. The apparatus as claimed in claim 1, wherein at least one said jack is a pluggable jack comprising a pluggable connection to the movable end of a respective one of the linear actuators, when said pluggable jack is loaded by a weight of the vehicle and clamped between said vehicle and said parking surface, the movable end of the respective one of the linear actuators is operable to be retracted to unplug said pluggable jack to free a motion of driving device, and operable to be moved to aim at the pluggable connection of said pluggable jack then extend and engage with said pluggable connection, so that said pluggable jack is operable to be retracted and free to move horizontally.

18. The apparatus as claimed in claim 1, further comprising at least one sensor to detect a clearance between at least one wheel of said vehicle and the parking surface, a control system is operable to stop the erecting of said jacks when said clearance reaches a predefined value.

19. The apparatus as claimed in claim 1, wherein at least one of a vehicle servicing tool and an equipment is installed on said driving device for servicing the vehicle above.

* * * * *